United States Patent
Azuma

(10) Patent No.: US 7,295,157 B2
(45) Date of Patent: Nov. 13, 2007

(54) ARRAY ANTENNA RECEIVER DEVICE

(75) Inventor: Tomohiro Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 76 days.

(21) Appl. No.: 10/518,564

(22) PCT Filed: Jun. 13, 2003

(86) PCT No.: PCT/JP03/07572

§ 371 (c)(1),
(2), (4) Date: Jul. 27, 2005

(87) PCT Pub. No.: WO04/002013

PCT Pub. Date: Dec. 31, 2003

(65) Prior Publication Data

US 2006/0164298 A1    Jul. 27, 2006

(30) Foreign Application Priority Data

Jun. 20, 2002  (JP) ............................. 2002-180070

(51) Int. Cl.
  *H01Q 3/26* (2006.01)
(52) U.S. Cl. .................. 342/368; 342/374; 342/174
(58) Field of Classification Search ................ 342/368, 342/371–372, 374, 377, 174
See application file for complete search history.

(56) References Cited

U.S. PATENT DOCUMENTS

2004/0070533 A1 * 4/2004 Azuma ....................... 342/174

FOREIGN PATENT DOCUMENTS

| JP | 5-84884 | 11/1993 |
| JP | 11-46180 | 2/1999 |
| JP | 2001-251124 | 9/2001 |
| JP | 2001-272447 | 10/2001 |
| JP | 2004-332925 | 11/2001 |
| JP | 2002-135034 | 5/2002 |
| JP | 2003-133837 | 5/2003 |
| WO | WO 02/35648 A1 * | 5/2002 |

* cited by examiner

*Primary Examiner*—Thomas H. Tarcza
*Assistant Examiner*—Fred H. Mull
(74) *Attorney, Agent, or Firm*—Scully, Scott, Murphy & Presser, P.C.

(57) ABSTRACT

Calibration signals are distributed to the respective output signals of a plurality of antenna elements, thereby multiplexing the distributed calibration signals with the respective signals of the plurality of antenna elements. The calibration signals are extracted from the respective output signals of the multiplexing means and modulated, and the SIR (Signal to Interference Ratio) values of the calibration signals are calculated. The SIR value as calculated by SIR calculating means each calibration period is compared with a SIR threshold value. Only when the SIR value exceeds the SIR threshold value, a demodulated result of the calibration signal is outputted. Further, in each reception branch, the calibration amount of amplitude/phase information is determined based on a reference demodulation result of the branch corresponding to the demodulation result of the branch corresponding to the demodulation result, and a user signal is corrected based on the calibration amount.

16 Claims, 9 Drawing Sheets

ARRAY ANTENNA RECEIVER DEVICE

The present application is based on Japanese patent application no. 2002-180070, the entire contents of which are incorporated herein by refernce.

TECHNICAL FIELD

The present invention relates to an array antenna receiver device, and particularly to an array antenna receiver device provided with a calibration device for correcting variations of phase (delay) and amplitude information in a plurality of reception branches.

BACKGROUND TECHNOLOGY

In a cellular mobile communication system and the like, such a system wherein an array antenna receiver device composed of a plurality of antenna elements having high correlations one another is used, whereby a reception directivity pattern is formed such that a reception gain increases with respect to an arrival direction of a desired signal, while a reception gain decreases with respect to interferences due to an interference or a delay wave from other users is heretofore studied with an intention of high speed/high quality of signals and increase in a capacity of subscribers.

Incidentally, in an array antenna receiving device having a plurality of radio receiving parts of antennas, generally, amplitude and phase variations in the radio receiving parts of the antennas connected to antenna elements, respectively, are independently varied every second. Accordingly, it is necessary for compensating such variations of phase and amplitude at the time of forming a reception directivity pattern, and such operation is called by the name of calibration.

As a conventional calibration method, there is, for example, a manner described in Japanese Patent Application Laid-open No. 11-46180 (Calibration apparatus for array antenna receiver device) wherein a known calibration signal is input to each radio receiving part connected to each antenna element, a demodulated result of the calibration signal is used to compensate phase (delay) and amplitude variations in each radio receiving part which varies independently every second.

FIG. 1 is a block diagram illustrating an array antenna receiver device for exemplifying a calibration described in the above patent application laid-open official gazette. The array antenna receiver device is composed of an array antenna 901, multiplexing circuits $903_1$ to $903_N$, a radio receiving part $904_1$ of an antenna 1 to a radio receiving part $904_N$ of an antenna N corresponding to antenna elements, respectively, a signal processing part $905_1$ of a user 1 to a signal processing part $905_M$ of a user M corresponding to the number of users, a calibration signal generating part 906, a calibration radio transmitting part 907, a power level variable part 908, N distributors 909, and a calibration signal processing part 910 wherein N of the N distributors corresponds to the number of antenna elements (multiplexing circuits).

The array antenna 901 is composed of the N antenna elements $902_1$ to $902_N$. The N antenna elements $902_1$ to $902_N$ are closely disposed so as to have correlations among reception signals of the respective antenna elements, wherein desired signals are multiplexed with a plurality of interference signals are received. For the sake of discriminating a usual diversity construction, N of the number of antenna elements is to be three or more.

To the multiplexing circuits $903_1$ to $903_N$, N outputs of the N distributors 909 and outputs of the antenna elements $902_1$ to $902_N$ are input to perform multiplexing in a radio transmission band, and the results are output to the radio receiving part $904_1$ of the antenna 1 to the radio receiving part $904_N$ of the antenna N. A multiplexing method is not limited, but there is, for example, code multiplexing.

Each of the radio receiving part $904_1$ of the antenna 1 to the radio receiving part $904_N$ of the antenna N is composed of devices such as a low noise amplifier, a band pass filter, a mixer, synthesizers, an AGC (Auto Gain Controller), a demodulator, a low pass filter, and an analog-to-digital converter (ADC) An explanation will be made herein upon the radio receiving part $904_N$ of the antenna N as an example. To the radio receiving part $904_N$ of the antenna N, an output of the multiplexing circuit $903_N$ is input to perform amplification of an input signal, a frequency conversion from a radio transmission band to a base band, demodulation, an analog-to-digital conversion and the like, and the results are output to the signal processing part $905_1$ of the user 1 to the signal processing part $905_M$ of the user M and the calibration signal processing part 910.

To the calibration signal processing part 910, outputs of the radio receiving part $904_1$ of the antenna 1 to the radio receiving part $904_N$ of the antenna N are input to extract calibration signals in input signals thereby to detect phase/amplitude information of the antenna 1 to phase/amplitude information of the antenna N, and the results are output to the signal processing part $905_1$ of the user 1 to the signal processing part $905_M$ of the user M. It is to be noted that a calibration signal multiplexed with an input signal is extractable.

To the signal processing part $905_1$ of a user 1 to a signal processing part $905_M$ of a user M, outputs of the radio receiving part $904_1$ of the antenna 1 to the radio receiving part $904_N$ of the antenna N and the phase/amplitude information of the antenna 1 to the phase/amplitude information of the antenna N being outputs from the calibration signal processing part 910 are input. Then, a reception directivity pattern is formed in such that a reception gain increases with respect to a user signal arrival direction in each user, while a reception gain decreases with respect to interferences from other users or an interference due to a delay wave while compensating outputs from the radio receiving part $904_1$ of the antenna 1 to the radio receiving part $904_N$ of the antenna N by the use of the phase/amplitude information of the antenna 1 to the phase/amplitude information of the antenna N, and a demodulation signal of the user 1 to a demodulating signal of the user M received by the reception directivity pattern are output.

The calibration signal generating part 906 produces a calibration signal in a base band, and the resulting calibration signal is output to the calibration radio transmitting part 907. To the calibration radio transmitting part 907, a calibration signal in a base band being an output of the calibration signal generator 906 is input to perform a digital-to-analog conversion, a frequency conversion from a base band to a radio transmission band and the like, and the results are output to the power level variable part 908.

To the power level variable part 908, a calibration signal in the same frequency band as that of a reception signal derived from the antenna elements $902_1$ to $902_N$ being an output of the calibration radio transmitting part 907 is input, and the results are output to the N distributors 909 at an arbitrary electric power level. The N distributors N-distribute calibration signals in a radio transmission band being outputs of the power level variable part, and the results are output to the N multiplexing circuits $903_1$ to $903_N$, respectively.

Each of signals received by the N antenna elements $902_1$ to $902_N$ contains a desired (user) signal component, an interference signal component, and thermal noises. Moreover, a multipath component exists, respectively, in the desired signal component and the interference signal component, and these signal components arrived usually from different directions.

The array antenna receiver device of FIG. 1 discriminates respective signal components of different arrival directions with the use of phase/amplitude information of the respective signals received by the N antenna elements $902_1$ to $902_N$ to form a reception directivity pattern.

In these circumstances, there is a case when phase/amplitude variations appear inside the respective radio receiving parts dependent upon a constructional device of the radio receiving part $904_1$ of the antenna 1 to the radio receiving part $904_N$ of the antenna N. As a result, different information from primary phase/amplitude information of the respective signals received by the antenna elements $902_1$ to $902_N$ is given to the signal processing part $905_1$ of the user 1 to the signal processing part $905_M$ of the user M, so that it becomes impossible to discriminate correctly the respective signal components, and thus, an ideal reception directivity pattern cannot be formed.

Accordingly, a reception signal is multiplexed with a calibration signal in the same frequency band as that of the reception signal received by the antenna elements $902_1$ to $902_N$ to detect phase/amplitude information of a calibration signal extracted from the respective outputs of the radio receiving part $904_1$ of the antenna 1 to the radio receiving part $904_N$ of the antenna N in the calibration signal processing part 910, whereby phase/amplitude information given by the signal processing part $905_1$ of the user 1 to the signal processing part $905_M$ of the user M is corrected.

When multiplexed with a calibration signal as described above, a calibration becomes possible even in case of working the array antenna receiver device. Namely, a calibration signal is in a state where it is multiplexed with a reception signal from a mobile phone, so that only a calibration signal component can be extracted. An example of such case as described above includes code multiplexing.

Non-linear circuits (particularly, an AGC) contained in the radio receiving part $904_1$ of the antenna 1 to the radio receiving part $904_N$ of the antenna N exhibit different manners of phase/amplitude variations dependent on a reception electric power level. Accordingly, a calibration signal of each output of the radio receiving part $904_1$ of the antenna 1 to the radio receiving part $904_N$ of the antenna N is extracted while changing a calibration signal power level with the power level variable circuit 908 to detect phase/amplitude information, whereby a calibration amount to be applied to phase/amplitude information given to the signal processing part $905_1$ of the user 1 to the signal processing part $905_M$ of the user M in each calibration signal power level is determined.

The array antenna receiver device having such calibration means as described above can correct the phase/amplitude information given to the signal processing part $905_1$ of the user 1 to the signal processing part $905_M$ of the user M, even in a case where phase/amplitude variations appear inside the radio receiving part $904_1$ of the antenna 1 to the radio receiving part $904_N$ of the antenna N at the time of application thereof. Furthermore, it is possible to achieve a high precision in response to a power level of a reception signal.

Thus, according to the array antenna receiver device of FIG. 1, respective signal components having different arrival directions one another are discriminated with the use of phase/amplitude information of respective signals received by the N antenna elements $902_1$ to $902_N$, so that an ideal reception directivity pattern can be formed.

However, the above-mentioned conventional array antenna receiver device involves the following problems. Namely, a first problem is in that the optimum calibration cannot be applied to all the reception branches in the case when a calibration is conducted at the time of application of the system. The reason of which is in that a magnitude of a reception signal input from each antenna element (a communication signal from a mobile phone, noises, an interference signal from other systems) exhibit a remarkable dispersion as a result of being affected adversely by fading and the like, so that a ratio of a calibration signal input to each reception branch in a constant equal electric power and a reception signal being an interference signal from an antenna element differs remarkably with each other.

Moreover, a second problem is in that a calibration of a high precision cannot be achieved in the case when a trouble occurs in a certain reception branch. The reason of which is in that the conventional array antenna receiver device is not provided with a means for judging signal quality of a calibration signal and a means for excluding the reception branch in which a trouble occurs.

A third problem is in that reception sensitivity of the array antenna receiver device deteriorates as a result of implementing a calibration in case of working the system. The reason of which is in that a calibration signal is a mere interference signal for a communication signal (desired wave) with a mobile phone and which is input from an array antenna, besides, particularly, when a calibration signal of a high level is input, an interference signal component increases.

A fourth problem is in that when a calibration is conducted at the time of working the system, the number of users in the system decreases. The reason of which is in that a calibration signal in question becomes an interference wave to deteriorate a ratio of a user signal from a mobile phone with respect to such interference signal, so that a transmission electric power in the mobile phone increases for demodulating the user signal with desired signal quality in its radio base station installation.

DISCLOSURE OF INVENTION

An object of the present invention is to provide an array antenna receiver device and a calibration method of array antenna reception signals by which the optimum calibration can be made upon all the reception branches, a calibration with a high precision can be conducted even if a trouble occurs in any reception branch, besides there is scarce deterioration in reception sensitivity, and the number of users in a cellular system is not decreased substantially.

In order to achieve the above-described object, the present invention provides an array antenna receiver device comprising a plurality of antenna elements; a means for outputting calibration signals; a means for distributing the calibration signals to the plurality of the antenna elements; a plurality of multiplexing means each of which multiplexes each calibration signal distributed with a signal input from each of the plurality of the antenna elements; a plurality of SIR calculating means each of which extracts and demodulates each calibration signal from an output signal of the multiplexing means to calculate a SIR (Signal to Interference Ratio) value, and further compares the SIR value calculated with a previously established SIR threshold value thereby to output reception branch information and a demodulation result of the calibration signal in only the case when the SIR value calculated exceeds the SIR threshold value; a means for storing a reference demodulation result which is previously established in each reception branch; a means for detecting a calibration amount of amplitude/phase information in each reception branch based on the demodulation result and the reference demodulation result in a branch corresponding to the storing means; and means for correcting a user signal based on the calibration amount.

Furthermore, in order to achieve the above-described object, the present invention provides an array antenna receiver device comprising a plurality of antenna elements; a means for outputting calibration signals; a plurality of multiplexing means for multiplexing each output signal from the plurality of the antenna elements with each calibration signal; a means for changing over connections of the output means with the plurality of the multiplexing means to supply calibration signals in a time sharing manner to the plurality of the multiplexing means; a plurality of SIR calculating means for extracting and demodulating successively calibration signals from output signals of one multiplexing means selected respectively in synchronous with supplying operations of the calibration signals from the supplying means in accordance with the time sharing manner to calculate a SIR (Signal to Interference Ratio) value, and further compares the SIR value calculated with a previously established SIR threshold value thereby to output reception branch information and a demodulation result of each calibration signal in only the case when the SIR value calculated exceeds the SIR threshold value; a means for storing a reference demodulation result which is previously established in each reception branch; a means for detecting a calibration amount of amplitude/phase information in each reception branch based on the demodulation result and the reference demodulation result in a branch corresponding to the storing means; and means for correcting a user signal based on the calibration amount.

Moreover, in order to achieve the above-described object, the present invention provides a calibration method of antenna reception signals comprising the steps of multiplexing a reception signal input in every plural antenna elements with a calibration signal distributed in the every plural antenna elements; extracting and demodulating a calibration signal from the multiplexed signal to calculate a SIR (Signal to Interference Ratio) value of the calibration signal; comparing the SIR value calculated with a previously established SIR threshold value to output reception branch information and a demodulation result of the calibration signal in only the case when the calculated SIR value exceeds the SIR threshold value; detecting a calibration amount of amplitude/phase information in every reception branches based on the demodulation result and the previously established reference demodulation result; and correcting a user signal based on the calibration amount.

Furthermore, in order to achieve the above-described object, the present invention provides a calibration method of antenna reception signals comprising the steps of multiplexing a reception signal input in every plural antenna elements with each calibration signal supplied in a time sharing manner in the every plural antenna elements; extracting and demodulating successively calibration signals from one multiplexing signal selected respectively in synchronous with supplying operations of the calibration signals in accordance with the time sharing manner to calculate a SIR (Signal to Interference Ratio) value of each calibration signal; comparing the SIR value calculated with a previously established SIR threshold value to output reception branch information and a demodulation result of the calibration signal in only the case when the calculated SIR value exceeds the SIR threshold value; detecting a calibration amount of amplitude/phase information in every reception branches based on the demodulation result and the previously established reference demodulation result; and correcting a user signal based on the calibration amount.

BEST MODE FOR EMBODYING THE INVENTION

In the following, embodiments according to the present invention will be described in detail by referring to the accompanying drawings.

First Embodiment

Figure 1:
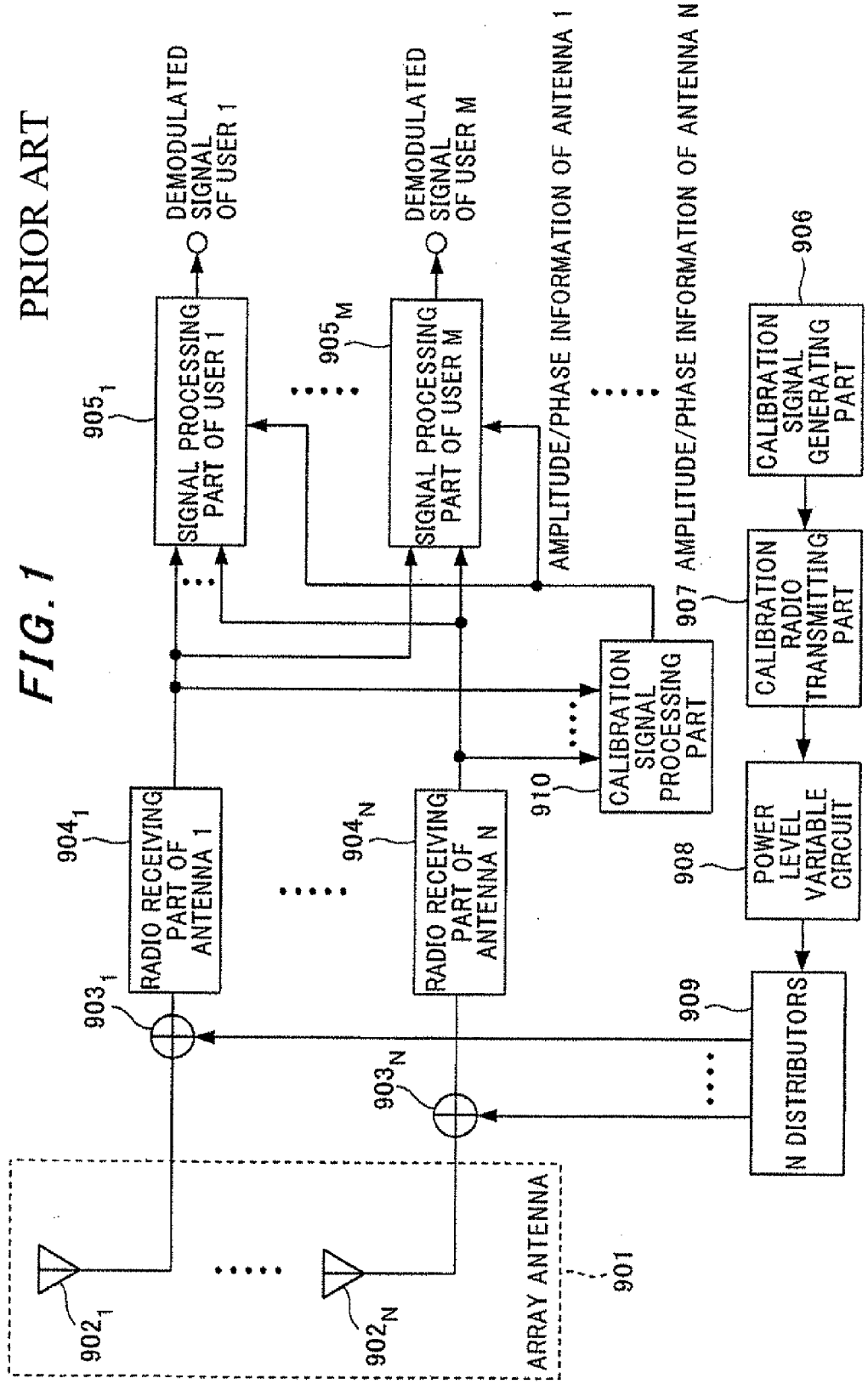
FIG. 1 is a block diagram illustrating an array antenna receiver device of a conventional example.
Figure 2:
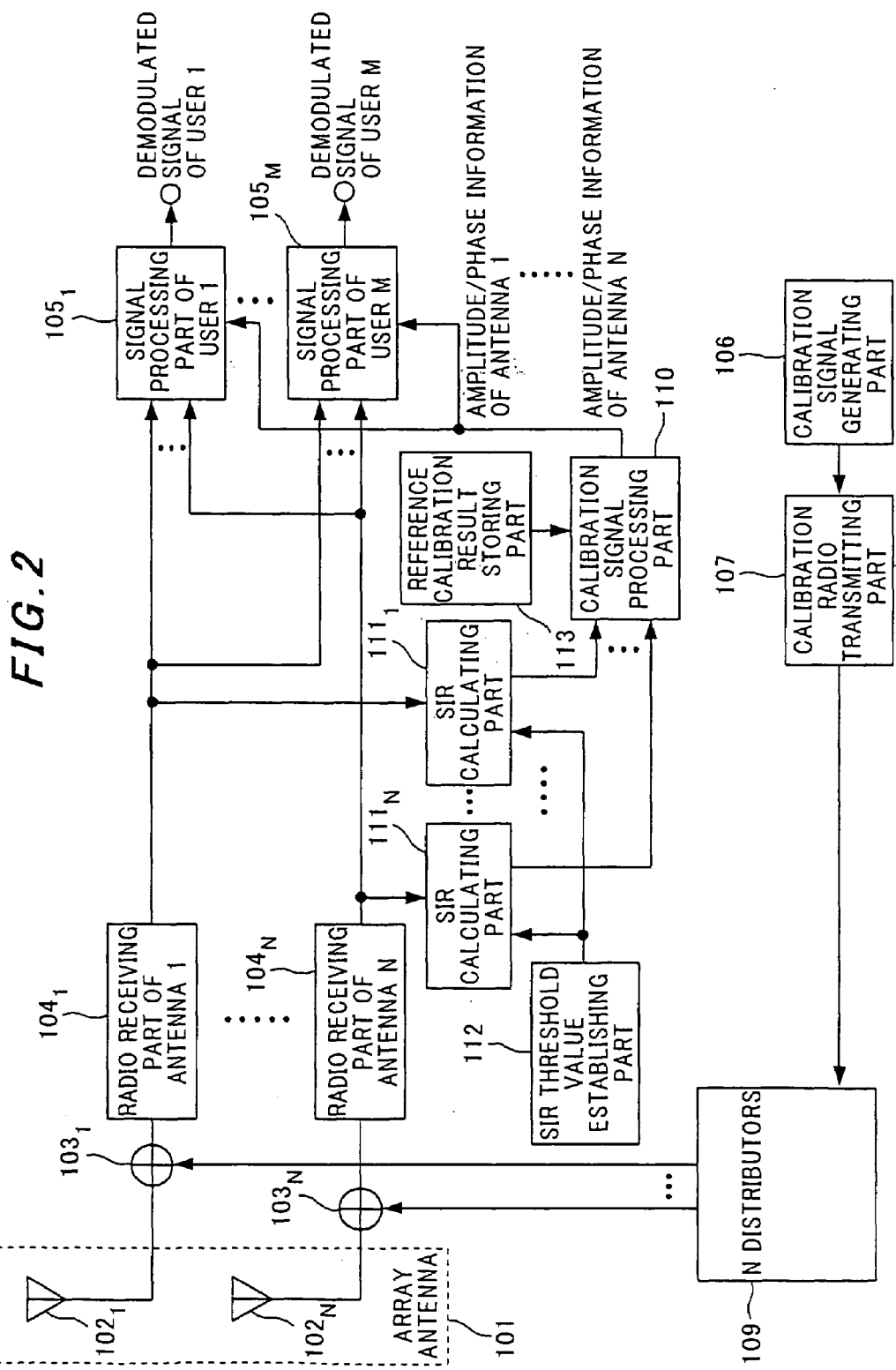
FIG. 2 is a block diagram illustrating a construction of a first embodiment according to an array antenna receiver device of the present invention.

FIG. 2 is a block diagram illustrating a construction of the first embodiment of an array antenna receiver device according to the present invention. In FIG. 2, an array antenna 101 is composed of N antenna elements $102_1$ to $102_N$, and these antenna elements are disposed closely with each other so as to increase correlativities in respective antennas.

Multiplexing circuits $103_1$ to $103_N$ are connected with the antenna elements $102_1$ to $102_N$, respectively. To the multiplexing circuits $103_1$ to $103_N$ calibration signals output from a calibration radio transmitting part 107 and N-distributed by N-distributors, and outputs of the respective antenna elements $102_1$ to $102_N$ are input, they are multiplexed in a radio transmission band, and the multiplexed results are output to a radio receiving part $104_1$ of an antenna 1 to a radio receiving part $104_N$ of an antenna N connected to the multiplexing circuits $103_1$ to $103_N$, respectively.

Each of the radio receiving part $104_1$ of the antenna 1 to the radio receiving part $104_N$ of the antenna N is composed of a low noise amplifier, a band pass filter, a mixer, synthesizers, a total received power detecting part, an AGC (Auto Gain Controller), a demodulator, a low pass filter, an analog-to-digital converter and the like. Outputs from the radio receiving part $104_1$ of the antenna 1 to the radio receiving part $104_N$ of the antenna N are connected to a signal processing part $105_1$ of a user 1 to a signal processing part $105_M$ of a user M and a SIR (Signal to Interference Ratio) calculating part $111_1$ to a SIR calculating part $111_N$, respectively. The SIR calculating part $111_1$ to the SIR calculating part $111_N$ are provided so as to correspond to a radio receiving part $104_1$ of the antenna 1 to a radio receiving part $104_N$ of the antenna N, respectively.

Outputs of the SIR calculating part $111_1$ to the SIR calculating part $111_N$ for extracting calibration signals and calculating STRs are connected to a calibration signal processing part 110, while outputs from a SIR threshold value establishing part 112 for establishing arbitrarily SIR threshold values required for calibrations are connected to the SIR calculating part $111_1$ to the SIR calculating part $111_N$ When a calibration signal is provided in the form of a code multiplexed signal, reverse diffusion is conducted for extracting a calibration signal.

A reference calibration result storing part 113 is connected with the calibration signal processing part 110 to output reference demodulation results (reference demodulation symbol points) in every reception branches.

To the calibration signal processing part 110, reception branch information (a signal indicating that it is received by which branch) being outputs of the SIR calculating part $111_1$ to the SIR calculating part $111_N$, and demodulation results (demodulation symbol points) as well as reference demodulation results being outputs of the reference calibration result storing part 113 are input. Then, the calibration processing part 110 compares these modulation results with the reference modulation results to detect amplitude/phase information of the antenna 1 to amplitude/phase information of the antenna N (indicating finite differences between the demodulation results and the reference demodulation results=calibration information), and the resulting calibration information is output to the signal processing part $105_1$ of the user 1 to the signal processing part $105_M$ of the user M, respectively.

A calibration signal generating part 106 produces calibration signals in a base band, and the calibration signals produced are output to a calibration radio transmitting part 107. The calibration signal generating part 106 may produce an arbitrary symbol pattern as a calibration signal.

To the calibration radio transmitting part 107, calibration signals in the base band being outputs of the calibration signal generating part 106 are input to perform a digital-to-analog conversion, a frequency conversion from base band to radio transmission band and the like, and the results are output to N distributors. Outputs of the N distributors 109 which distribute calibration signals input from the calibration radio transmitting part 107 into the number N of reception branches are connected to the multiplexing circuits $103_1$ to $103_N$, respectively.

In the following, operations in the first embodiment will be described. First, the array antenna 101 is composed of the N antenna elements $102_1$ to $102_N$, and these N antenna elements are closely disposed from one another so as reception signals in the respective antenna elements to have high correlations with each other. Each of the antenna elements receives a signal communicating with a mobile phone (hereinafter referred to as "user signal") and another signal which is multiplexed by a plurality of interference signals. When the number of antenna elements increases in reality, correlations among antenna elements which are not adjacent to each other and positioned apart from one another come to be low, so that an electric power of the multiplexed signal received exhibits a remarkable dispersion. In other words, a different electric power is input to each antenna element of an array antenna receiver device.

The multiplexing circuits $103_1$ to $103_N$ are connected to the antenna elements $102_1$ to $102_N$, and calibration signals distributed to N outputs by the N distributors and outputs of the respective antenna elements $102_1$ to $102_N$ are input to the multiplexing circuits $103_1$ to $103_N$, whereby multiplexing is conducted in a radio transmission band, and the results are output to the radio receiving part $104_1$ of the antenna 1 to a radio receiving part $104_N$ of the antenna N connected respectively to the multiplexing circuits $103_1$ to $103_N$.

In this case, a calibration signal in a base band produced in the calibration signal generating part 106 is amplified and frequency-converted by the calibration radio transmitting part 107 to transmit the resulting signal as a known signal. When it is intended to suppress deterioration in receiver sensitivity of a user signal to 0.2 dB or less with the use of a calibration signal, it is equal to that a noise power level does not deteriorate up to 0.2 dB at the most, so that an electric power ratio x with respect to a calibration signal level comes to be x<−13.267 dB from $0.2 > 10 \times \log(10^{0/10} + 10^{x/10})$, when the noise power level is considered to be 0 dB. Accordingly, it is required that an electric power for transmitting a calibration signal is to be a fixed level lower than a noise electric power level by −13.267 dB or less in order that receiver sensitivity of an array antenna receiver device is scarcely affected adversely.

In this case, those output from the multiplexing circuits $103_1$ to $103_N$ are calibration signals, user signals, interference signals from the other systems, and thermal noises. In this connection, when it is considered that a sum of these signals is a total reception electric power, since the calibration signals and the thermal noises are constant electric powers, a difference of the total reception electric power output from the respective multiplexing circuits to the radio receiving part $104_1$ of the antenna 1 to the radio receiving part $104_N$ of the antenna N comes to be a difference of "the user signals and the interference signals of the other systems" input from the respective antenna elements as they are.

Although The radio receiving part $104_1$ of the antenna 1 to the radio receiving part $104_N$ of the antenna N perform amplification, frequency conversion, and analog-to-digital conversion, they are controlled by the AGCs contained in the radio receiving parts of the antennas such that the output levels are always maintained at constant levels. Therefore, an electric power ratio of calibration signals in outputs of the radio receiving parts of the antennas becomes high in the case where user signals and interference signals from other systems are low, while The ratio becomes low in the case where the user signals and interference signals from other systems are high.

Figure 3:
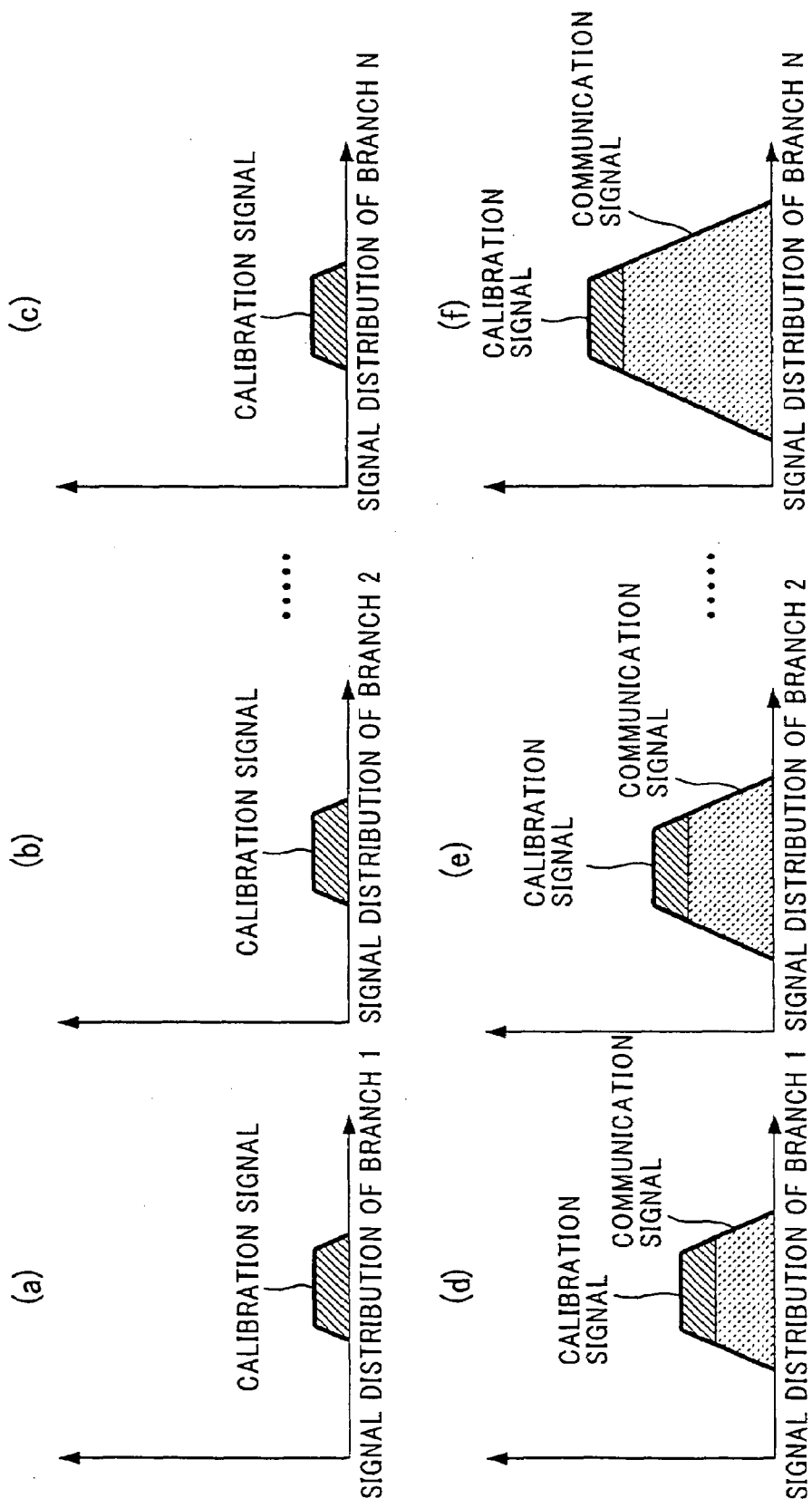
FIGS. 3(a), (b), (c), (d), (e), and (f) are representations each showing an electric power distribution of a calibration signal and a user signal in each reception branch of the embodiment in FIG. 2.

For the sake of simplicity in explanation, electric power distributions in N reception branches are shown (prior to applying gain control by an AGC) with only aiming at each calibration signal and each communication signal (user signal) FIGS. 3(a) to (c) show states where only calibration signals are input to the N reception branches, while FIGS. 3(d) to (f) show states where calibration signals of the same levels and communication signals of different electric powers are input to the N reception branches.

Since an output from a radio receiving part of an antenna is controlled by an AGC so as to be a constant electric power, a calibration signal and a user signal are output from each radio receiving part of an antenna with the same electric power in each reception branch while maintaining a ratio of a calibration signal and a user signal as it is as shown in FIGS. 3(d) to (f) Accordingly, when a calibration signal is extracted and demodulated, and further a SIR of the calibration signal is calculated in each SIR calculating part, the results are a SIR of branch 1>a SIR of branch 2>a SIR of branch N.

In order to increase a SIR of a calibration signal in a calibration, it is general to prolong a period of time for averaging results obtained, but a required length of an averaging time for ensuring a SIR required for calibration comes to be branch 1<branch 2<branch N. In other words, reception branch information and a demodulation result are output with the shortest calibration period in the reception branch 1 among the SIR calculating part $111_1$ to the SIR calculating part $111_N$, then, the reception branch 2 follows thereto, and the reception branch N has the latest order, so that calibration periods differ from one another.

Figure 4:
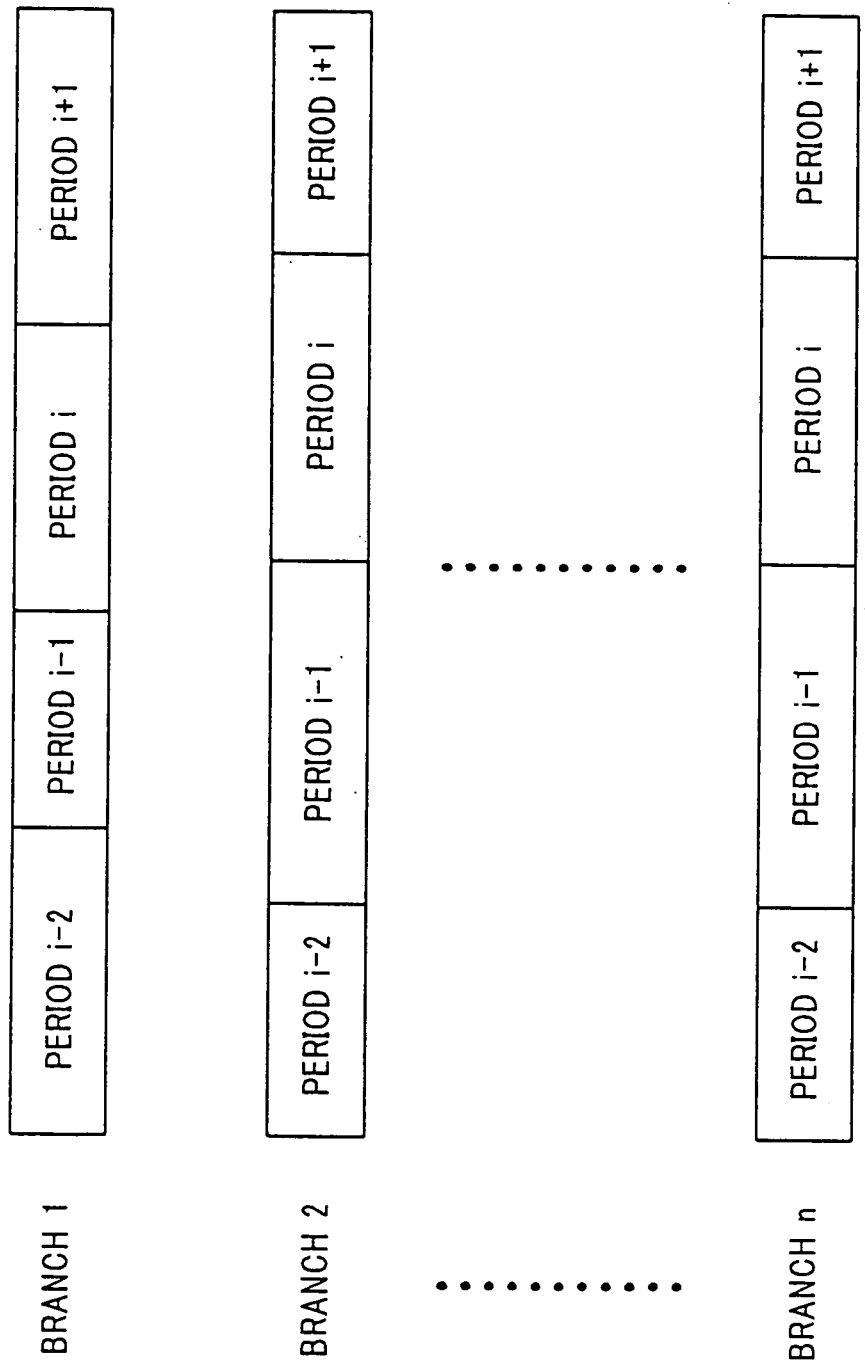
FIG. 4 is a representation showing an example of asynchronous calibration periods in respective reception branches of the embodiment in FIG. 2.

FIG. 4 shows a state where the respective reception branches have different calibration periods. The term "calibration period" means a period of time for extending from outputting reception branch information and demodulation results to outputting newly reception branch information and demodulation results in the respective SIR calculating parts.

The SIR threshold establishing part 112 can establish arbitrarily a SIR threshold value of a calibration signal, and SIR threshold values established are output to the SIR calculating part $111_1$ to the SIR calculating part $111_N$. The SIR calculating part $111_1$ to the SIR calculating part $111_N$ extract and demodulate calibration signals from all the reception signals output from the radio receiving part $104_1$ of the antenna 1 to the radio receiving part $104_N$ of the antenna N, and calculate SIRs of the calibration signals, respectively.

In the respective SIR calculating parts, the SIR values of the calibration signals calculated and SIR threshold values from the SIR threshold value establishing part 112 are compared, and reception branch information and demodulation results of the calibration signals are output to the calibration signal processing part 110 from only the SIR calculating parts relating to which a SIR value of a calibration signal calculated exceeds a SIR threshold value. In this case, calibration periods differ from one another in every reception branches or in each period of time in even the same branch as mentioned above. Thus, in each SIR calculating part, a SIR of a calibration signal is calculated, a SIR value and a SIR threshold value are compared until the SIR value calculated exceeds the SIR threshold value, and reception branch information and a demodulation result of a calibration signal are output to the calibration signal processing part 110 at the time when the SIR value exceeds the SIR threshold value.

In the case where a SIR of a calibration signal calculated in each SIR calculating part does not exceed a SIR threshold value from the SIR threshold value establishing part 112 after elapsing an averaging period of time for obtaining a sufficient SIR (for example, one minute), even if user signals or interference signals from other systems of high power are further input from the respective antenna elements, reception information and a trouble detection signal are output from a corresponding SIR calculating part to the calibration signal processing part 110.

It may be considered that modulation results output from the SIR calculating part $111_1$ to the SIR calculating part $111_N$ as a result of exceeding SIR threshold values assure a precision necessary for calibration. Hence, demodulation results input from the respective SIR calculating parts are compared with reference demodulation results from the reference calibration result storing part 113 in every reception branches, i.e. reference demodulation results of corresponding reception branches in the calibration signal processing part 110 to extract a variation amount of amplitude/phase in each branch, thereby to update a calibration amount, and the results are output to the signal processing part $105_1$ of the user 1 to the signal processing part $105_M$ of the user M, respectively.

Figure 5:
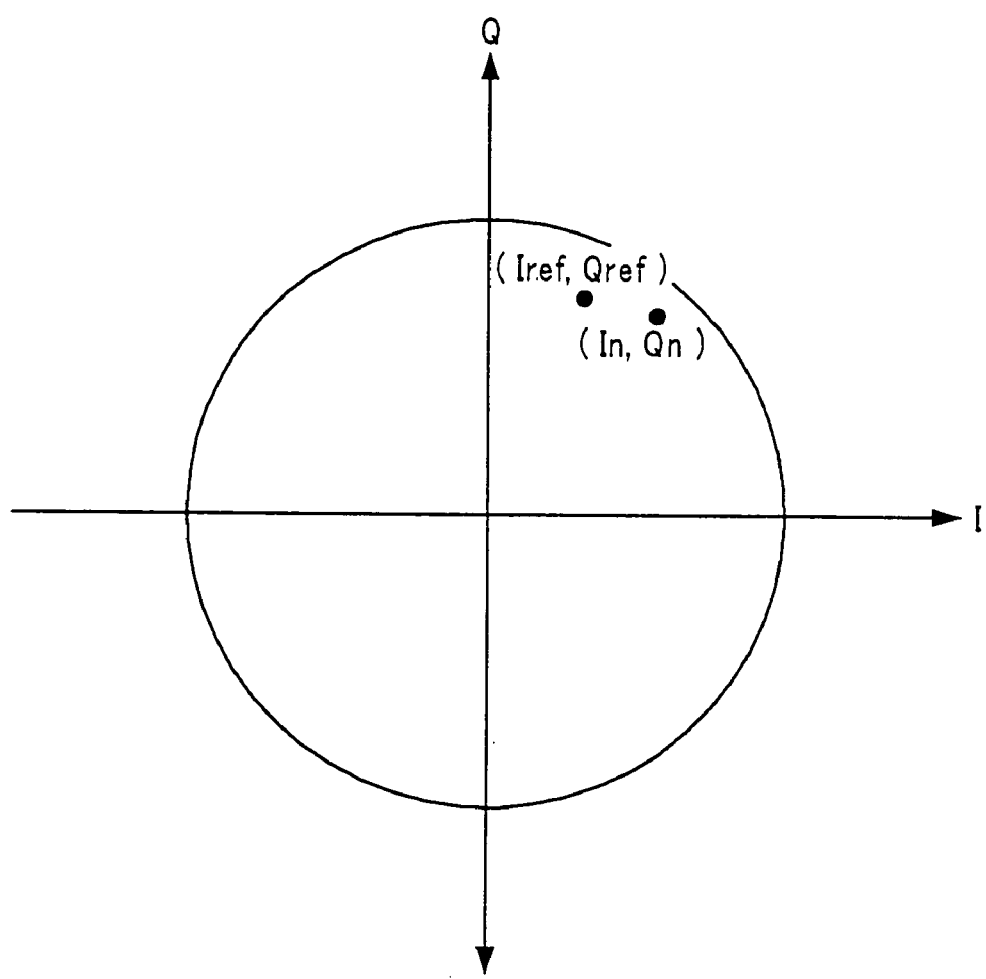
FIG. 5 is a diagram for explaining a relationship between a reference demodulation result and a demodulation result of a calibration signal in the first embodiment.

In this connection, reference modulation results being outputs of the reference calibration result storing part 113 mean reference symbol points of respective reception branches wherein amplitude/phase properties are aligned at N reception branches, and calibration amounts are calculated from variation amounts of the demodulation results (symbol points) output from the respective SIR calculating parts corresponding to the respective reference symbol points. A relationship between a reference symbol point ($I_{ref}$, $Q_{ref}$) in a certain reception branch and a demodulation result ($I_n$, $Q_n$) output from a SIR calculating part connected to the branch is shown in FIG. 5.

On one hand, the calibration signal processing part 110 controls the signal processing part $105_1$ of the user 1 to the signal processing part $105_M$ of the user M in such that a user signal from a certain branch is made ineffective because a trouble appears in the questioned branch in the case when reception branch information and a trouble detection signal are input from the SIR calculating part.

To the signal processing part $105_1$ of the user 1 to the signal processing part $105_M$ of the user M, outputs from the radio receiving part $104_1$ of the antenna 1 to the radio receiving part $104_N$ of the antenna N and amplitude/phase information of the antenna 1 to amplitude/phase information of the antenna N output successively from the calibration signal processing part 110 are input, whereby a reception directivity pattern is formed in such that a reception gain increases with respect to a user signal arrival direction, whilst a reception gain decreases with respect to interferences from other users and interferences due to delay waves in every users while correcting outputs of the radio receiving part $104_1$ of the antenna 1 to the radio receiving part $104_N$ of the antenna N by the use of the amplitude/phase information of the antenna 1 to the amplitude/phase information of the antenna N, and thus, a demodulation signal of a user 1 to a demodulation signal of a user M which are received by the reception directivity pattern are output.

As described above, when a calibration signal of a fixed electric power which deteriorates scarcely a user signal is used, an averaging process is continued until a SIR of a calibration signal extracted from the respective radio reception parts exceeds a SIR threshold value, and a modulation result ($I_n$, $Q_n$) of a calibration signal is output in only the case when the SIR of a calibration signal extracted from the respective radio reception parts reaches the SIR threshold value. Then the result obtained is compared with a demodulation result ($I_{ref}$, $Q_{ref}$) being a reference, whereby a calibration having the most efficient calibration period with respect to respective reception branches and maintaining at a certain calibration accuracy can be made. Furthermore, it becomes also possible to exclude a reception branch in which a trouble appears.

Second Embodiment

Figure 6:
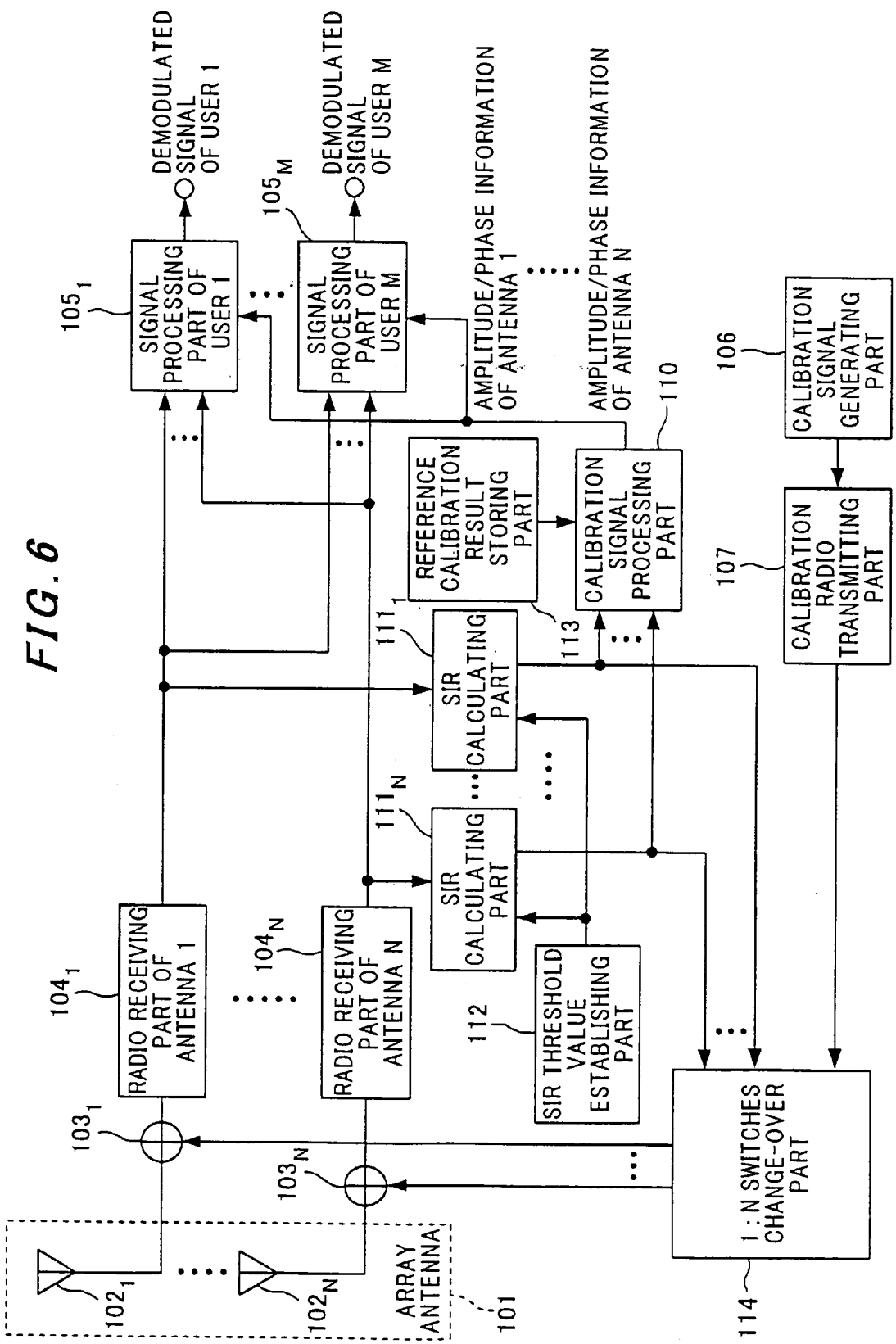
FIG. 6 is a block diagram illustrating a second embodiment of the present invention.

FIG. 6 is a block diagram illustrating an array antenna receiver of the second embodiment according to the present invention wherein parts shown in FIG. 6 corresponding to those of FIG. 2 are designated by the same reference characters as those of FIG. 2, respectively, and a detailed description therefor is omitted. A difference of the second embodiment from that of the first embodiment of FIG. 2 resides in such a point that a 1: N switches change-over part 114 is used in place of the N distributors 109, and calibration signals are supplied to multiplexing circuits $103_1$ to $103_N$ in accordance with a time sharing manner, and the other construction is the same as that of FIG. 2.

The multiplexing circuits $103_1$ to $103_N$ are connected to antenna elements $102_1$ to $102_N$ and N outputs of the 1: N switches change-over part 114. To the multiplexing circuits $103_1$ to $103_N$, outputs of the antenna elements $102_1$ to $102_N$ and a calibration signal output from a calibration radio transmitting part 107 to be supplied to only one arbitrary multiplexing circuit by the 1: N switches change-over part 114 are input, whereby multiplexing is made in a radio transmitting band, and results are output to a radio receiving part $104_1$ of an antenna 1 to a radio receiving part $104_N$ of an antenna N connected respectively to the multiplexing circuits $103_1$ to $103_N$.

Outputs of a SIR calculating part $111_1$ to a SIR calculating part $111_N$ each of which extracts or demodulates a calibration signal and calculates a SIR are connected to a calibration signal processing part 110 and the 1: N switches change-over part 114, while outputs of a SIR threshold value establishing part 112 wherein a SIR threshold value required for calibration is arbitrarily established are connected to the SIR calculating part $111_1$ to a SIR calculating part $111_N$. It is to be noted that when a calibration signal is provided in the form of a code multiplexed signal, reverse diffusion is conducted for extracting a calibration signal.

To a calibration radio transmitting part 107, a calibration signal in a base band which is an output of a calibration signal transmitting part 106 is input to implement a digital-to-analog conversion, and a frequency conversion from a base band to a radio transmission band, and the results are output to the 1: N switches change-over part 114. N outputs of the 1: N switches change-over part 114 which outputs calibration signals input from the calibration radio transmitting part 107 to only one arbitrary multiplexing circuit are connected to the multiplexing circuits $103_1$ to $103_N$, respectively.

In the following, operations of the second embodiment will be described wherein the same operations as those of the first embodiment are simply described.

To the 1: N switches change-over part 114, a calibration signal being an output of the calibration radio transmitting part 107 is input to output the calibration signal to only one arbitrary multiplexing circuit in the N multiplexing circuits $103_1$ to $103_N$ connected to the N switches change-over part 114. Furthermore, reception branch information and demodulation results are input from respective SIR calculating parts to the 1: N switches change-over part 114, and the 1: N switches change-over part 114 controls change-over of connections with the multiplexing circuits based on reception branch information.

For instance, it is arranged in such that the 1: N switches change-over part 114 is changed over so as to be connected in such order of the multiplexing circuits $103_1$, $103_2$, . . . $103_N$. In this case, only the output signals from the SIR calculating parts corresponding to reception branches connected with the 1: N switches change-over part 114 are made to be effective, while output signals from the SIR calculating parts which are not connected with the 1: N switches change-over part 114 are made to be ineffective.

The multiplexing circuits $103_1$ to $103_N$ are connected to the antenna elements $102_1$ to $102_N$, respectively, to which calibration signals input to only one arbitrary multiplexing circuit by means of the 1: N switches change-over part 114 and outputs of the respective antenna elements $102_1$ to $102_N$ are input, whereby multiplication is conducted in a radio transmission band, and the results are output to the radio receiving part $104_1$ of the antenna 1 to the radio receiving part $104_N$ of the antenna N connected respectively to the multiplexing circuits $103_1$ to $103_N$. In other words, multiplication of signals input from the antenna elements with calibration signals is implemented in only one multiplexing circuit selected by the 1: N switches change-over part 114 among the multiplication circuits, so that those output from the other multiplexing circuits are merely reception signals input from antenna elements.

The SIR threshold value establishing part 112 can establish arbitrarily a SIR threshold value of a calibration signal, and outputs the SIR threshold value established. The respective SIR calculating parts extract and demodulate calibration signals from reception signals output from radio receiving parts of antennas, and calculate SIRs of the calibration signals as in the case of the first embodiment. Furthermore, the SIRs of the calibration signals calculated are compared with SIR threshold values from the SIR threshold establishing part 112, and reception branch information and demodulation results of calibration signals from only a SIR calculating part in which a calculated SIR value exceeds a SIR threshold value are output to a calibration signal processing part 110 in the respective SIR calculating parts.

In this case, N multiplexing circuits are successively changed over by the 1: N switches part 114, N SIR calculating parts calculate successively SIRs of calibration signals in response thereto, and compare the calculated SIR values with SIR threshold values. As described above, the SIRs are calculated in the SIR calculating part in every predetermined periods according to a time sharing manner of the 1: N switches change-over part 114, and reception branch information and demodulation results of calibration signals are output to the calibration signal processing part 110 at the time when a calculated SIR value exceeds a SIR threshold value.

The calibration signal processing part 110 compares the demodulation results with reference demodulation results of corresponding reception branches from a reference calibration result storing part 113 to update a calibration amount, and it is output to each user signal processing part. Operations of the calibration signal processing part 110 are the same as those of FIG. 2. It is to be noted that reception branch information and the like from the respective SIR calculating parts are output to the 1: N switches change-over part 114, and connections with multiplexing circuits are changed over based on the information in the 1: N switches change-over part 114.

Moreover, when an SIR of a calibration signal calculated in each SIR calculating part does not exceed a SIR threshold value from the SIR threshold value establishing part 112, reception branch information and a trouble detection signal are output to the calibration signal processing part 110 from the corresponding SIR calculating part as in the case of the first embodiment, even though user signals or interference signals of a high electric power from other systems are input from respective antenna elements and after the lapse of an averaging period of time sufficient to obtain a SIR (e.g. one minute).

Figure 7:
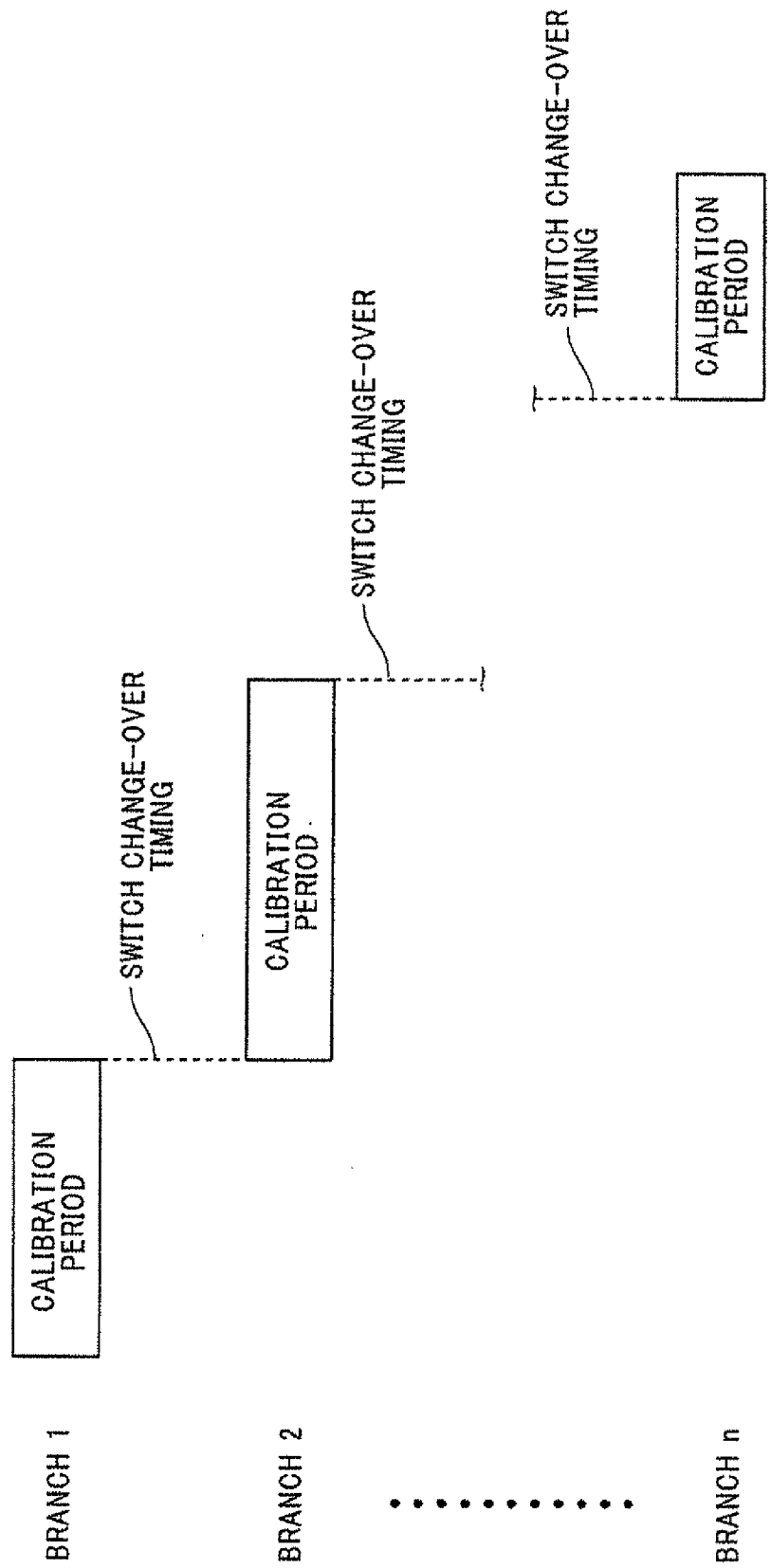
FIG. 7 is a diagram for explaining an example of calibration periods in case of changing over 1: N switches of the second embodiment.

As mentioned above, when the 1: N switches which obtain a calibration signal of a fixed electric power which does scarcely deteriorate a user signal and supply a calibration signal to only one arbitrary multiplexing circuit are used to perform an averaging process until a SIR of a calibration signal extracted from each radio receiving part exceeds a SIR threshold value, and a demodulation result ($I_n$, $Q_n$) of the calibration signal is output in only the case when reached the threshold value, whereby the result is compared with a demodulation result ($I_{ref}$, $Q_{ref}$) being reference, so that a calibration which maintains at a constant precision in time sharing manner can be conducted with respect to respective reception branches. A situation of a calibration period wherein a control processing is performed in accordance with the present embodiment is shown in FIG. 7.

Third Embodiment

Figure 8:
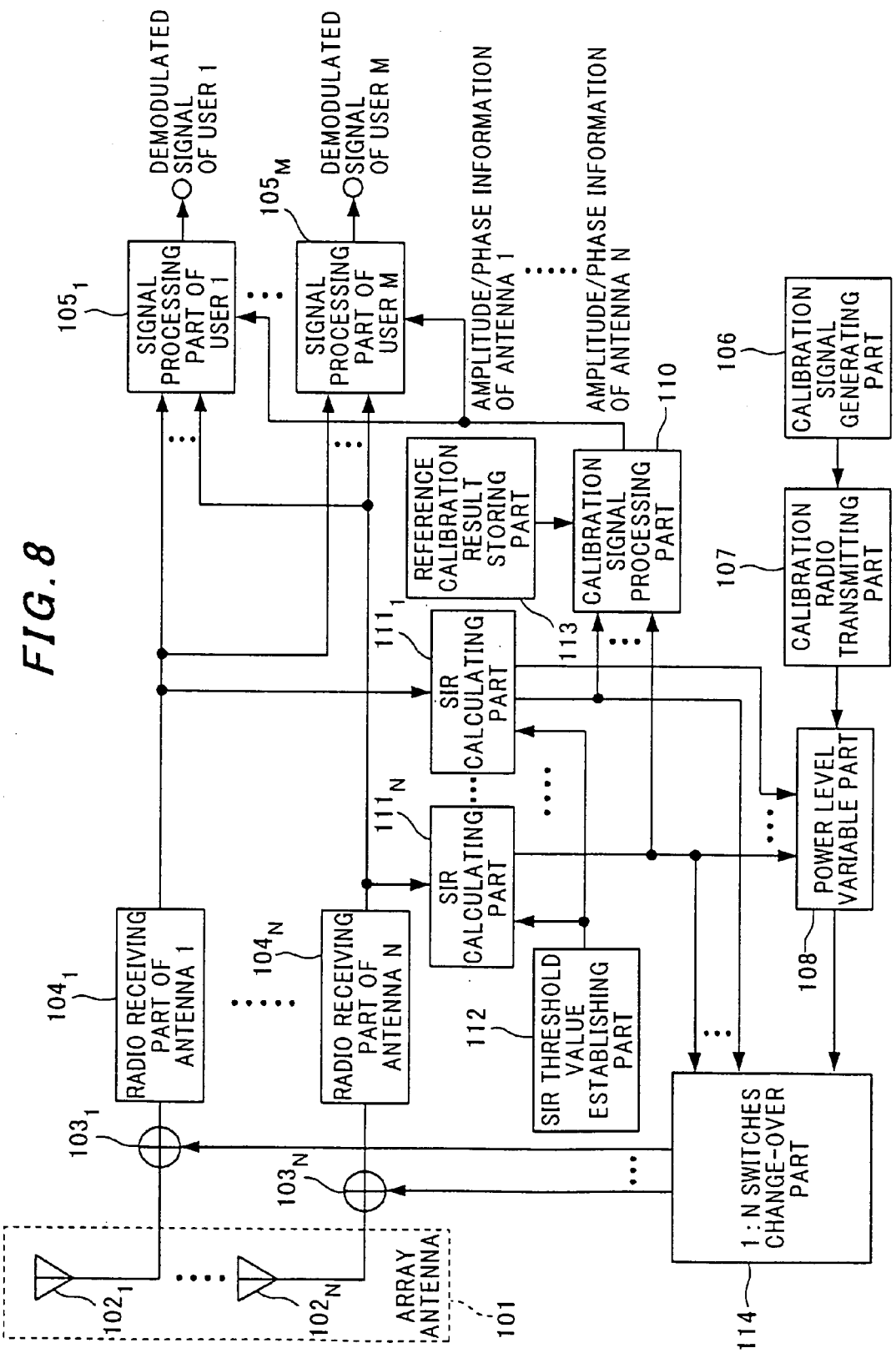
FIG. 8 is a block diagram illustrating a third embodiment of the present invention.

FIG. 8 is a block diagram illustrating a construction of an array antenna receiver of the third embodiment according to the present invention wherein parts shown in FIG. 8 corresponding to those of FIG. 6 are designated by the same reference characters as those of FIG. 6, respectively, and a detailed description therefor is omitted. A difference of the third embodiment from that of the second embodiment resides in such a point that transmission electric power control is made in every reception branches by the use of a power level variable part 108, and the other construction is the same as that of the second embodiment.

Either outputs from a SIR calculating part $111_1$ to a SIR calculating part $111_N$ wherein a calibration signal is extracted and demodulated, and further, a SIR is calculated are connected to a calibration signal processing part 110 and a 1:N switches change-over part 114, while outputs of a SIR threshold value establishing part 112 wherein a SIR threshold value required for a calibration is arbitrarily established are connected to the SIR calculating part $111_1$ to the SIR calculating part $111_N$. Furthermore, the other outputs of the SIR calculating part $111_1$ to the SIR calculating part $111_N$ are connected to the power level variable part 108. Moreover, when a calibration signal is provided in the form of a code multiplexed signal, reverse diffusion is conducted for extracting a calibration signal.

To a calibration radio transmitting part 107, a calibration signal in a base band which is an output of a calibration signal transmitting part 106 is input to implement a digital-to-analog conversion, and a frequency conversion from a base band to a radio transmitting band, and the resulting outputs are connected to the power level variable part 108. The power level variable part 108 implements transmission electric power control with respect to a calibration signal input from the calibration radio transmitting part 107 in accordance with a transmission electric power control signal output from each SIR calculating part, and the resulting output is connected to the 1:N switches change-over part 114.

In this case, a term "transmission electric power control signal" output from a SIR calculating part means a signal for controlling a transmission electric power of a calibration signal in response to a calculated SIR value, and a manner of control in this signal is such that when a SIR value has the smaller value, a transmission electric power of a calibration signal makes to be the larger, while when the SIR value exhibits the larger value, a transmission electric power of the calibration signal makes to be the smaller.

In the following, operations of the third embodiment will be described. In the SIR threshold value establishing part 112, a SIR threshold value of a calibration signal can be arbitrarily established, and a SIR threshold value established is output. The SIR calculating part $111_1$ to the SIR calculating part $111_N$ extract calibration signals from reception signals output from a radio receiving part $104_1$ of an antenna 1 to a radio receiving part $104_N$ of an antenna N, respectively, and demodulate them to calculate SIRs of the calibration signals.

Reception branch information and demodulation results are output from only a SIR calculating part wherein a SIR of a calibration signal calculated in each radio receiving part of an antenna exceeds a SIR threshold value output from the SIR threshold value establishing part 112 to the calibration signal processing part 110 and the 1:N switches change-over part 114. Moreover, the SIR calculating part $111_1$ to the SIR calculating part $111_N$ calculate a split-second SIR of a calibration signal in each reception branch, and output a transmission electric power control signal as mentioned above to the power level variable part 108 in order to conduct transmission electric power control of a calibration signal.

To the power level variable part 108, a calibration signal of a fixed level output from the calibration radio transmitting part 107 is input to control a transmission electric power of the calibration signal in accordance with a transmission electric power control signal output from each SIR calculating part, whereby the calibration signal of the electric power optimized in a reception branch connected through the 1:N switches change-over part 114 is output.

In the present embodiment, from which a transmission electric power control signal is output is an arbitrary SIR calculating part to which a calibration signal is input, so that such an advantage that a calibration period can be reduced in a reception branch in question. It is to be noted that operations are the same as those of the second embodiment except that a transmission electric power is controlled in the present embodiment.

Fourth Embodiment

Figure 9:
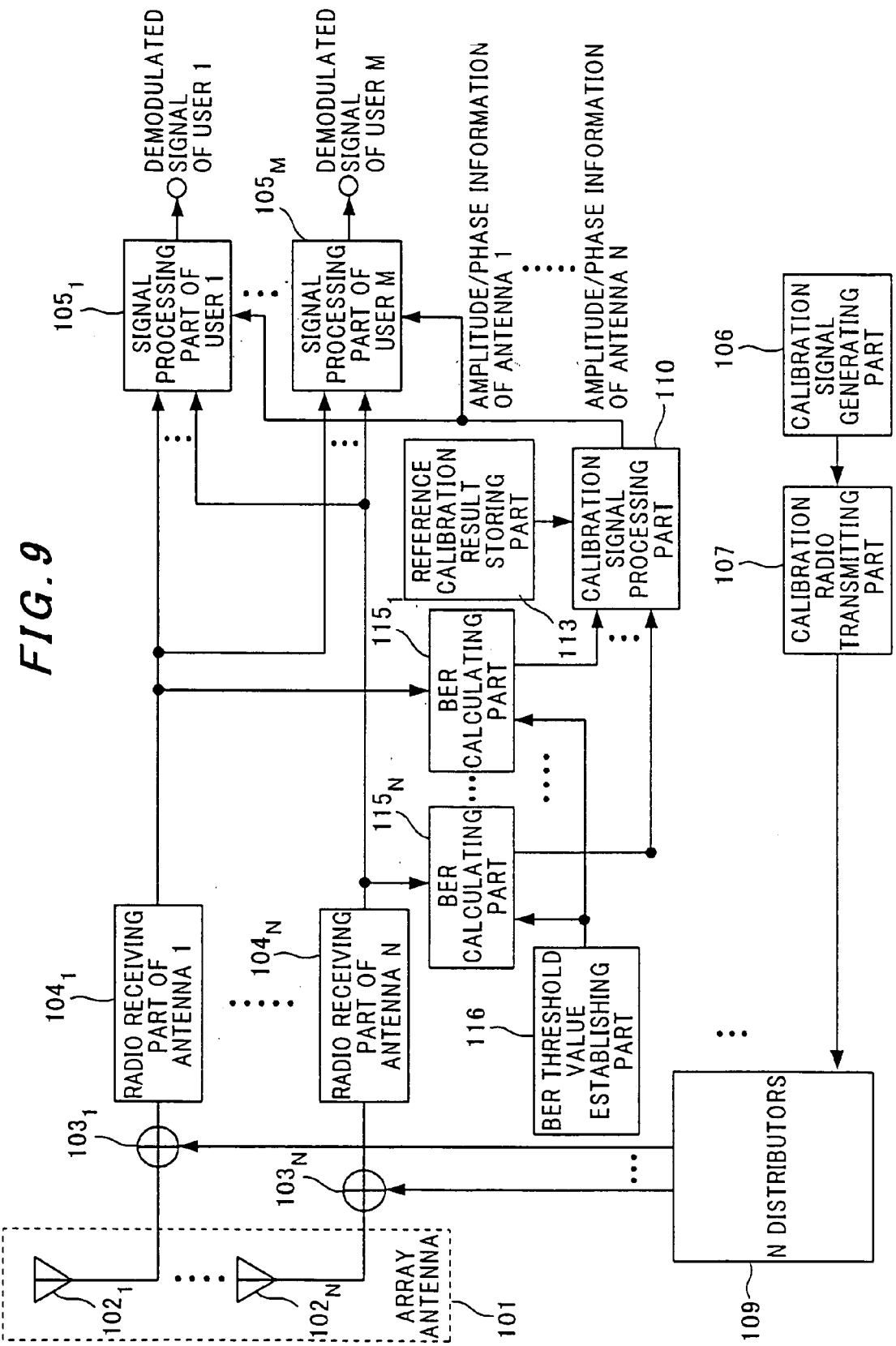
FIG. 9 is a block diagram illustrating a fourth embodiment.

FIG. 9 is a block diagram illustrating an array antenna receiver of the fourth embodiment according to the present invention which is different from the first embodiment of FIG. 2 in that BER calculating parts $115_1$ to $115_N$ are used in place of the SIR calculating part $111_1$ to the SIR calculating part $111_N$, and a BER threshold value establishing part 116 is used in place of the SIR threshold value establishing part 112, while the other constructions are the same as those of FIG. 2.

In the first embodiment, although a SIR of a calibration signal extracted from each radio receiving part of an antenna is calculated in the SIR calculating part $111_1$ to the SIR calculating part $111_N$, the other manner is also applicable so far as the manner relating to a method for measuring signal quality. In the present embodiment, a bit error rate is calculated with respect to a calibration signal by means of the BER calculating parts $115_1$ to $115_N$, while the BER threshold value establishing part 116 outputs a BER threshold value. As described above, the same advantageous effects as those of the former embodiments can be achieved, even if BER is used in place of SIR.

Furthermore, the fourth embodiment may be modified, as a matter of course, as in the second embodiment in such that multiplex circuits are changed over in accordance with a time sharing manner by the use of the 1:N switches change-over part 114, or as in the third embodiment in such that a transmission electric power of a calibration signal is controlled by the use of the power level variable part 108.

In the above-described embodiments, although an example of a receiver device using an array antenna wherein antenna elements are disposed so as to attain high correlations among the antenna elements is described, the present invention is not limited thereto, but it is also applicable to a receiver device using an antenna wherein antenna elements are disposed so as to attain low correlations among the antenna elements.

INDUSTRIAL APPLICABILITY

As described above, the present invention has the following advantageous effects. Namely, a first advantage can realize a calibration method by which the best efficient calibration period is held in each reception branch, and maintained at constant calibration accuracy. The reason of which is in that a calibration is independently carried out in each branch, and a period of a calibration continues until a SIR value of a calibration signal calculated in each reception branch exceeds an established SIR threshold value.

A second advantageous effect is to be capable of providing a calibration method by which a reception branch wherein a trouble appears is excluded. The reason of which is in that when quality of a calibration signal (a required SIR or BER) is not assured in each reception branch, reception signal information from the reception branch in question is made to be ineffective.

A third advantageous effect is to be capable of providing a calibration method by which reception sensitivity of a user signal (desired wave) deteriorates scarcely due to a cause of a calibration signal in respect of a mobile phone. The reason of which is in that a calibration signal of a fixed level being sufficiently smaller than a noise electric power is input to each radio reception part of an antenna, so that a noise electric power level is scarcely elevated. Besides, since a calibration signal of an electric power suitable for one reception branch is output even in a case where a transmission electric power of a calibration signal is controlled, there is no influence with respect to reception sensitivity of a user signal.

A fourth advantageous effect is to be capable of providing a calibration method by which the number of users in a cellular system is scarcely reduced. The reason of which is in that a calibration signal of a fixed level being sufficiently smaller than a noise electric power is input to each radio reception part of an antenna, and an averaging process is continued until a SIR required for conducting a calibration in each reception branch, so that there is not such a case where a calibration signal changes into an interference signal to make a ratio of a user signal from a mobile phone to the interference signal inferior, whereby a transmission output of the mobile phone is allowed to increase for demodulating the user signal in question up to signal quality desired in a base station installation.

What is claimed is:

1. An array antenna receiver device comprising:
a plurality of antenna elements;
a means for outputting calibration signals;
a means for distributing the calibration signals to the plurality of the antenna elements;
a plurality of multiplexing means each of which multiplexes each calibration signal distributed with a signal input from each of the plurality of the antenna elements;
a plurality of SIR calculating means each of which extracts and demodulates each calibration signal from an output signal of the multiplexing means to calculate a SIR (Signal to Interference Ratio) value, and further compares the SIR value calculated with a previously established SIR threshold value thereby to output reception branch information and a demodulation result of the calibration signal only when the SIR value calculated exceeds the SIR threshold value;
a means for storing a reference demodulation result which is previously established in each reception branch;
a means for detecting a calibration amount of amplitude/phase information in each reception branch based on the demodulation result and the reference demodulation result in a branch corresponding to the storing means; and
means for correcting a user signal based on the calibration amount.

2. The array antenna receiver device as defined in claim 1 wherein an electric power of the calibration signal is a fixed electric power sufficiently smaller than a noise electric power in a receiver of a radio base station installation.

3. The array antenna receiver device as defined in claim 1 wherein a calibration period for updating a calibration amount in each reception branch differs from one another in every reception branch or in each period of time in the same reception branch.

4. The array antenna receiver device as defined in claim 1 wherein the calibration amount calculating means calculates a calibration amount with respect to only a reception branch to which a demodulation result of a calibration signal is input.

5. The array antenna receiver device as defined in claim 1 wherein when the SIR value does not reach a SIR threshold value, a user signal in a reception branch in question is made to be ineffective as a result of judging that a problem appears in the reception branch in question.

6. The array antenna receiver device as defined in claim 1 wherein a BER (Bit Error Rate) is used in place of the SIR value.

7. The array antenna receiver device as defined in claim 1, wherein a problem detection signal is output when the SIR value calculated does not exceed the SIR threshold value.

8. The array antenna receiver device as defined in claim 1, wherein each of the plurality of calculating means calculates the SIR value for a period of calibration until the SIR value calculated exceeds the SIR threshold value.

9. An array antenna receiver device comprising
a plurality of antenna elements;
a means for outputting calibration signals;
a plurality of multiplexing means for multiplexing each output signal from the plurality of the antenna elements with each calibration signal;
a means for changing over connections of the output means with the plurality of the multiplexing means to supply calibration signals in a time sharing manner to the plurality of the multiplexing means;
a plurality of SIR calculating means for extracting and demodulating successively calibration signals from output signals of one multiplexing means selected respectively in synchronous with supplying operations of the calibration signals from the supplying means in accordance with the time sharing maimer to calculate a SIR (Signal to Interference Ratio) value, and further compares the SIR value calculated with a previously established SIR threshold value thereby to output reception branch information and a demodulation result of each calibration signal in only the case when the SIR value calculated exceeds the SIR threshold value;

a means for storing a reference demodulation result which is previously established in each reception branch;

a means for detecting a calibration amount of amplitude/phase information in each reception branch based on the demodulation result arid the reference demodulation result in a branch corresponding to the storing means; and means for correcting a user signal based on the calibration amount.

10. The array antenna receiver device as defined in claim 9 comprising further a means for controlling a transmission electric power of a calibration signal based on a control signal in response to a SIR value of the SIR calculating means.

11. The array antenna receiver device as defined in claim 9 wherein the supplying means changes over connections with the multiplexing means based on reception branch information from the SIR calculating means.

12. The array antenna receiver device as defined in claim 9 wherein an electric power of the calibration signal is a fixed electric power sufficiently smaller than a noise electric power in a receiver of a radio base station installation.

13. The array antenna receiver device as defined in claim 9 wherein when the SIR value does not reach a SIR threshold value, a user signal in a reception branch in question is made to be ineffective as a result of judging that a problem appears in the reception branch in question.

14. The array antenna receiver device as defined in claim 9 wherein a BER (Bit Error Rate) is used in place of the SIR value.

15. A calibration method of antenna reception signals comprising the steps of:

multiplexing a reception signal input in every plural antenna elements with a calibration signal distributed in the every plural antenna elements;

extracting and demodulating a calibration signal from the multiplexed signal to calculate a SIR (Signal to Interference Ratio) value of the calibration signal;

comparing the SIR value calculated with a previously established SIR threshold value to output reception branch information and a demodulation result of the calibration signal only when the calculated SIR value exceeds the SIR threshold value;

detecting a calibration amount of amplitude/phase information in every reception branch based on the demodulation result and the previously established reference demodulation result; and correcting a user signal based on the calibration amount.

16. A calibration method of antenna reception signals comprising the steps of:

multiplexing a reception signal input in every plural antenna elements with each calibration signal supplied in a time sharing manner in the every plural antenna elements;

extracting and demodulating successively calibration signals from one multiplexing signal selected respectively in synchronous with supplying operations of the calibration signals in accordance with the time sharing manner to calculate a SIR (Signal to Interference Ratio) value of each calibration signal;

comparing the SIR value calculated with a previously established SIR threshold value to output reception branch information and a demodulation result of the calibration signal only when the calculated SIR value exceeds the SIR threshold value;

detecting a calibration amount of amplitude/phase information in every reception branch based on the demodulation result and the previously established reference demodulation result; and correcting a user signal based on the calibration amount.

* * * * *